Mason & Rice,
Bail Ear.
No. 101,483. Patented Apr. 5, 1870.
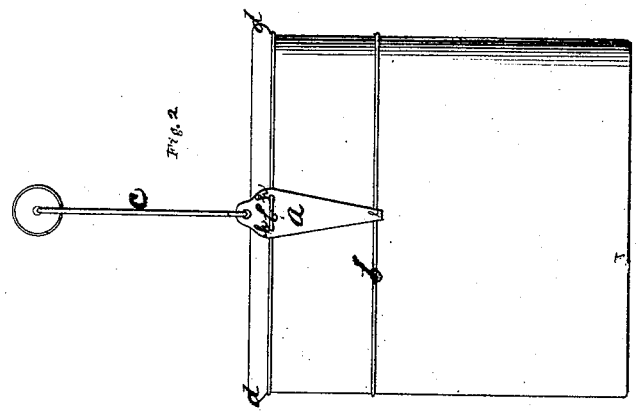
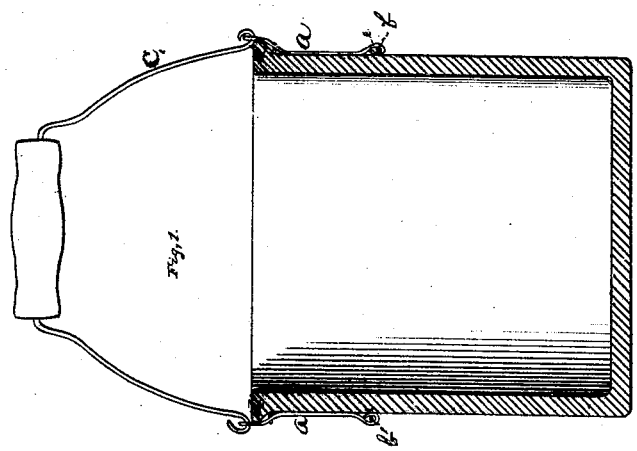
Witnesses
Robert C. Forrester
Jas H Cowly
Inventors
William D. Mason
Arthur T. Rice

United States Patent Office.

WILLIAM D. MASON AND ARTHUR T. RICE, OF CHICAGO, ILLINOIS.

Letters Patent No. 101,483, dated April 5, 1870.

IMPROVEMENT IN BAIL-EARS.

The Schedule referred to in these Letters Patent and making part of the same.

*To whom it may concern:*

Be it known that we, WILLIAM D. MASON and ARTHUR T. RICE, of the city of Chicago and State of Illinois, have invented a new and useful Improvement in Bailing Earthen Jars; and we do hereby declare that the following is a true and exact description of the same, reference being had to the accompanying drawings and to the letters of reference marked thereon forming a part of this specification.

Figure 1 is a vertical section of our jar, showing the bail and the two ears, and Figure 2 is a view at right angles with fig. 1, showing one ear and the method of attaching it.

The object and nature of this invention are to provide a sufficient and proper method or means of practically and economically applying a bail to an earthen jar, whereby it can be used and handled with entire safety.

We make use of an ear with an eye at the top end, for inserting the bail, and at the lower end of the ear we make another eye by turning the end in, as shown in fig. 1.

The upper part of the ear is bent out, so as to cause it to conform to the projection $d$ and rim of the jar, as shown in fig. 1.

At or near the point where this bend is made, we punch two holes, $h\ h$, through the ear, as seen in fig. 2. We then take small wire $b$, and draw it around the jar, and pass it through these two holes in the ear. The two ends of the wire are then joined and fastened together. This wire is drawn around the jar immediately under the projecting rim $d$, as shown in fig. 1.

Through the eye $e$, at the lower end of the ear, we pass a second wire, and around the jar the two ends are also joined and fastened together.

We employ two ears—one directly opposite the other. This firmly attaches the ears to the jar. An ordinary bail, $c$, is then inserted in the ears, and the jar is ready for use. This enables us to use an earthen jar with as much freedom and ease as an ordinary pail.

Having thus described our invention,

What we claim as new, and desire to secure by Letters Patent, is—

The ear $a$, with the eye $e$ and holes $h\ h$, as constructed and applied.

WILLIAM D. MASON.
ARTHUR T. RICE.

Witnesses:
ROBERT H. FORRESTER,
JAS. A. COWLES.